(12) United States Patent
Popov et al.

(10) Patent No.: US 7,434,244 B2
(45) Date of Patent: Oct. 7, 2008

(54) METHOD AND SYSTEM FOR RECOMMENDING CONTENT

(75) Inventors: Andrei Vladimirovich Popov, Seongnam-si (KR); Hyo-seop Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 647 days.

(21) Appl. No.: 10/922,847

(22) Filed: Aug. 23, 2004

(65) Prior Publication Data

US 2005/0076365 A1 Apr. 7, 2005

(30) Foreign Application Priority Data

Aug. 28, 2003 (KR) ............. 10-2003-0059919

(51) Int. Cl.
*H04N 7/14* (2006.01)
(52) U.S. Cl. ............................................. 725/34
(58) Field of Classification Search .................. 725/34
See application file for complete search history.

(56) References Cited

U.S. PATENT DOCUMENTS

| | | | |
|---|---|---|---|
| 5,699,125 A | | 12/1997 | Rzeszewski et al. |
| 5,872,850 A | * | 2/1999 | Klein et al. ................ 705/51 |
| 6,104,334 A | * | 8/2000 | Allport ..................... 341/175 |
| 6,438,579 B1 | * | 8/2002 | Hosken ..................... 709/203 |
| 7,188,355 B1 | * | 3/2007 | Prokopenko et al. .......... 725/46 |

FOREIGN PATENT DOCUMENTS

| | | |
|---|---|---|
| CN | 1346571 A | 4/2002 |
| JP | 10063679 | 3/1998 |
| JP | 2000-227918 | 8/2000 |
| JP | 2002142160 | 5/2002 |
| JP | 2002245082 | 8/2002 |
| KR | 2000-0045149 A | 7/2000 |
| KR | 2002-0096004 A | 12/2002 |
| KR | 2003-0037359 A | 5/2003 |
| WO | WO 00/72582 A1 | 11/2000 |

OTHER PUBLICATIONS

Beerud Dilip Sheth, "A Learning Approach to Personalized Information Filtering", Massachusetts Institute of Technology Feb. 1994.

* cited by examiner

*Primary Examiner*—Chong H Kim
(74) *Attorney, Agent, or Firm*—Sughrue Mion, PLLC

(57) ABSTRACT

Provided are a method and system for recommending content. The method and system enable a user to be given recommendations of contents similar to what he/she likes. The method for recommending content includes creating a user profile according to a predetermined model based on a user's reaction to the content, obtaining content features from one or more data sources, and creating a list of recommended contents according to a predetermined process based on the user profile and the content features. The system for recommending content includes a user profiling module that creates user profiles according to a predetermined model based on a user's reaction to the content, a digital television module that obtains content metadata from one or more data sources, and a content rating module that creates a list of recommended contents based on the user profile and the content metadata received from the user profiling module and the digital television module. The user can be given recommendations of contents similar to what he/she likes.

8 Claims, 6 Drawing Sheets

US 7,434,244 B2

METHOD AND SYSTEM FOR RECOMMENDING CONTENT

BACKGROUND OF THE INVENTION

This application is based on and claims priority from Korean Patent Application No. 10-2003-0059919 filed on Aug. 28, 2003 in the Korean Intellectual Property Office, the disclosure of which is incorporated herein in its entirety by reference.

1. Field of the Invention

The present invention relates to a method and system for recommending content, and more particularly, to a method and system for rating content using a user's profile and recommending the highest-ranking content to the user.

2. Description of the Related Art

With the advent of digital TVs, it has become possible for users to enjoy unprecedentedly diversified multimedia contents. Along with the huge amount of available information, it has become an increasing challenge for the users to find the location where relevant contents reside in a timely way. Since usability of contents provided by a service provider is determined whether it is relevant to the end user's information needs, numerous information systems and applications have been developed for content customization. As one of those developed applications, a recommendation technology is implemented in the form of a centralized system such as an Internet-based personal electronic program guide (EPG) service, or a distributed environment such as a digital TV and a set-top box.

Much research and effort into content recommendation technologies has been conducted and a variety of techniques have been proposed. Most existing systems rely on several approaches including user profiling, content rating activity, and so on.

User profiling is employed for the purpose of creating profiles based on user preference data, which may gradually change over time according to users' changeable interests and favorites. A conventional user profiling approach has employed explicit feedback or explicit preference items provided by a content user or implicitly observed the characteristics of user behavior to the content. In order to set explicit preference items, a user needs to input item values corresponding to detailed user preferences of various fields, which is time-consuming work and requires elaborate efforts, degrading system effectiveness. Conversely, extraction of implicit preference items eliminates user troubles of having to directly define preference items. In other words, users do not have to input information on genres of great interest, favorite movie actors or actresses, their ages, etc. This implicit profiling allows continuous monitoring without user intervention, thus providing information on user preferences continuously for a long period of time.

However, known systems present a problem in that they analyze some limited aspects of a user's behavior. For example, only selection for playing specific content or which channel the user tunes to is usually taken into consideration. An improved system only uses the temporal characteristics of a user's behavior such as playtime as material for discovering the user's preferences. Here, the playtime may not be identical to actual viewing time. When the behavior being observed is limited in scope in this way, a user profile degrades in quality. Thus, to measure user preferences, there is a need for a model having a more complicated structure, that is, various parameters.

Meanwhile, the content rating process is performed to measure the possibility of user satisfaction with specific content. Unlike user profiling, this approach provides users with a limited list of high-ranking contents, which is often called custom electronic program guide. Existing systems have rated priority of contents by keyword or association-based associativity measurement, unlike in the user profiling module. Although the keyword-based approach is effective for text filtering, it may not be useful enough to be applied for audiovisual contents because it cannot be accompanied by comprehensive and full text description.

The association-based approach is based on the existence of a predefined content-type hierarchical structure (e.g. drama, news, sports, music, etc.). This approach is used to measure a degree of content appropriateness when the type of content does not match a user profile. In the conventional association-based approach, associativity between contents is measured using either a depth or path length. In the former case, two different types of contents are compared with each other by measuring each depth relative to the common uppermost type node in the content-type hierarchical structure. In the latter case, the number of links between nodes in a semantic network is counted. While the depth-based method tends to overlook the actual distance between nodes that will undergo measurement of associativity, a path length-based method tends not to consider the depths of the nodes, i.e., their degrees of generality. In addition, since there are an unlimited number of content-type hierarchical structures available that are organized according different rules, there is a need for a method for measuring associativity more flexibly that can be easily applied to differently organized hierarchical structures.

SUMMARY OF THE INVENTION

The present invention provides a more elaborate model for measuring a user's preference, a model for flexibly measuring associativity between contents across a wide variety of hierarchical structures, and a method and system for recommending content to users using the models.

According to an aspect of the present invention, there is provided a method for recommending content including: creating a user profile according to a predetermined model based on a user's reaction to the content; obtaining content features from one or more data sources; and creating a list of recommended contents according to a predetermined process based on the user profile and the content features.

The creating of the user profile may comprise defining content fields for specific content and the user's behaviors for each content field, applying a different weight to each of the user's behaviors, and calculating a content rating for the relevant content according to a predetermined method. Here, the content rating R is calculated by:

$$R = \frac{\sum_{i=1}^{n} W_i}{T}$$

wherein W is a weight for each behavior, n is the number of behaviors observed in the specific content, and T is a length of time during which a content item is run.

In obtaining the content features, the one or more data sources contain at least one of Advanced Television Systems Committee (ATSC) Program and System Information Protocol (PSIP) metadata and TV-Anytime metadata.

The creating of the list of recommended contents may comprise calculating a content rating for each entity in a predetermined hierarchical classification structure using a content rating obtained from the user profile and the content metadata according to a predetermined calculation method and creating the list of recommendations that contains contents with ratings that exceed a predetermined value. Here, the calculation method is used to obtain an associative value of each $$\text{entity} = \frac{n}{\frac{m}{N} + N}$$

based on the content rating obtained from the user profile and the content metadata wherein N denotes the total number of levels in a given hierarchical structure, n denotes the level of a parent category in the overall hierarchical structure, and m denotes the depth from a parent category to a child category, and a content rating is obtained for each entity using the associative value obtained by the calculation.

According to another aspect of the present invention, there is provided a system for recommending content including a user profiling module that creates user profiles according to a predetermined model based on a user's reaction to the content, a digital television module that obtains content metadata from one or more data sources, and a content rating module that creates a list of recommended contents based on the user profile and the content metadata received from the user profiling module and the digital television module.

Preferably, the user profiling module comprises one or more profilers that defines content fields and observes user's behaviors for each content field, and a user profile management unit that applies a different weight to each of the user's behaviors observed by the one or more profilers and calculates a content rating for the relevant content according to a predetermined method.

The user profile management unit preferably calculates the content rating R by:

$$R = \frac{\sum_{i=1}^{n} W_i}{T}$$

wherein W is a weight for each behavior, n is the number of behaviors observed in the specific content, and T is a length of time during which a content item is run.

The digital television module may include one or more data sources containing at least one of a Program and System Information Protocol (PSIP) handler for handling Advanced Television Systems Committee (ATSC) PSIP metadata and a TV-Anytime metadata handler for handling TV-Anytime metadata.

The content rating module may include at least one of a keyword agent and a classifier agent, the keyword agent performing content rating by calculating a correlation coefficient between the user profile data and the content descriptive metadata for each user and content, and the classifier agent performing content rating based on the respective categories, including genres, languages, and channels. Preferably, the classifier agent calculates an associative value of each entity based on the content rating obtained from the user profile and the content metadata using the following equation:

$$\text{Associative value} = \frac{n}{\frac{m}{N} + N}$$

wherein N denotes the total number of levels in a given hierarchical structure, n denotes the level of a parent category in the overall hierarchical structure, and m denotes the depth from a parent category to a child category, and wherein a content rating is obtained for each entity using the associative value obtained by the calculation.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

Exemplary embodiments of the present invention will now be described in detail.

Figure 1:
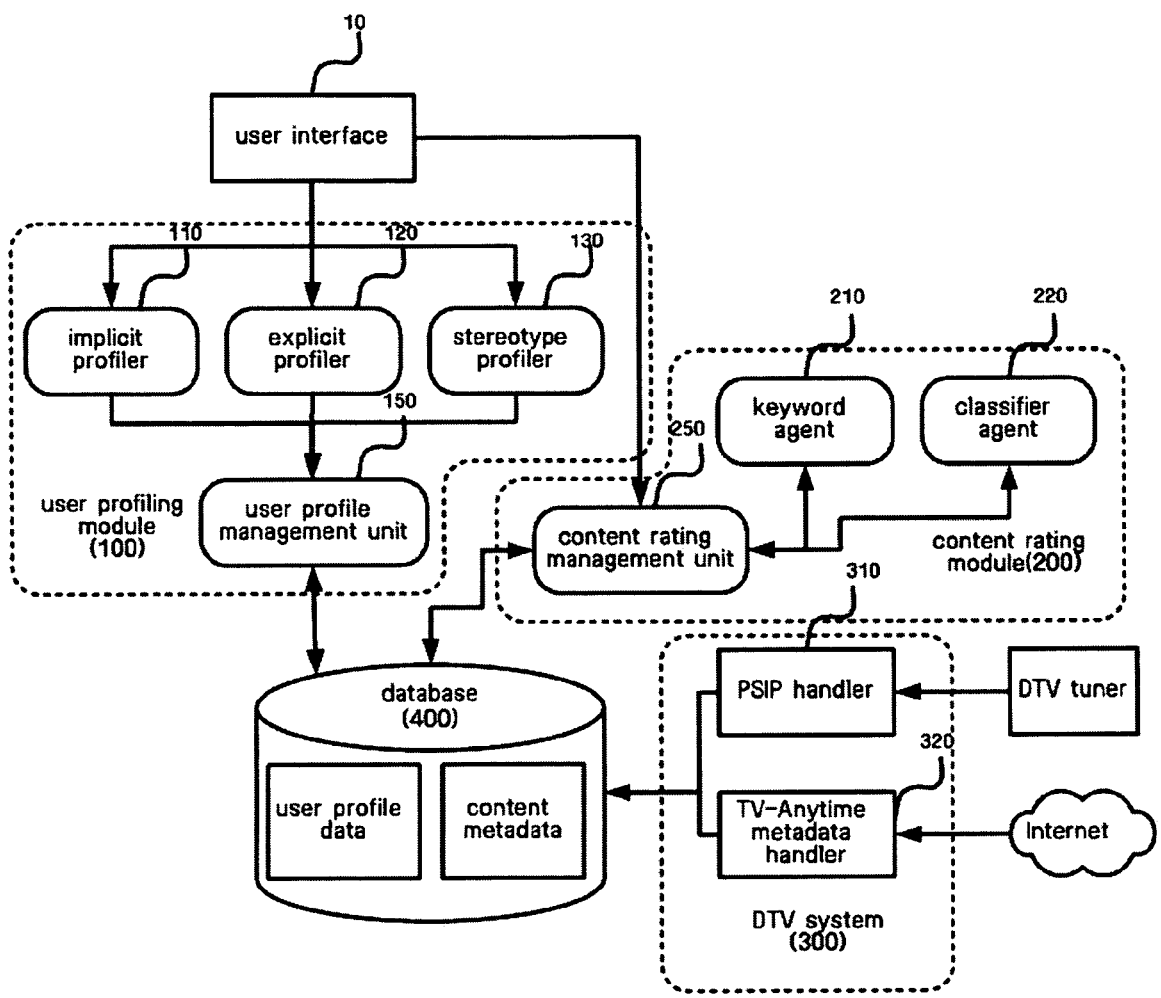
FIG. 1 is a block diagram showing the configuration of a content recommendation system according to an embodiment of the present invention.

FIG. 1 is a block diagram showing the configuration of a content recommendation system according to an embodiment of the present invention. Referring to FIG. 1, a content recommendation system mainly includes a user profiling module 100 and a content rating module 200.

For more accurate, flexible creation of user profiles, the user profiling module 100 may include a plurality of profilers. As shown in FIG. 1, the user profiling module 100 includes an implicit profiler 110, an explicit profiler 120, and a stereotype profiler 130. First, the implicit profiler 110 analyzes user's viewing habits so that the system of the present invention can dynamically adapt to shifting user's interests. The explicit profiler 120 allows the user to explicitly set user's preference items through a user interface 10 of a digital television (DTV). The stereotype profiler 130 provides sets of stereotyped preference items that have already been input for user's benefit. Selecting one of sets of stereotyped preference items can save the user the trouble of making an entry in a blank form containing listing of preferences. Thus, the user can set values of the preference items by selecting one of the sets of stereotype information in which the respective parameter values for preference items have been preset instead of manually entering all the preference items one at a time. A user profile management unit 150 consolidates a large amount of data provided by the respective profilers 110, 120, and 130 into a user profile. The user profile data created for each user is stored in a database 400.

The content rating module 200 creates a list of recommended contents for the user through content rating and includes a plurality of agents 210 and 220 and a content rating management unit 250. In the illustrative embodiment of FIG. 1, the content rating module 200 comprises two agents, i.e., a keyword agent 210 and a classifier agent 220. The content rating management unit 250 performs two main functions.

First, the content rating management unit 250 extracts and stores subsets of consolidated content description data that are sufficient for recommending functions. In this case, raw data is provided through a DTV module 300. The DTV module 300 is comprised of Program and System Information Protocol (PSIP) handler 310 and TV-Anytime metadata handler 320. While the PSIP handler 310 receives Advanced Television Systems Committee (ATSC)-compliant terrestrial DTV programs through a DTV tuner, the TV-Anytime metadata handler 320 receives ATSC-compliant content via a wired or wireless Internet network. Here, the DTV module 300 may include two or more handlers. The content rating management unit 250 processes the raw content metadata received from the DTV module 300 (by extracting content recommendation information) and stores the processed content metadata in the database 400.

Second, the content rating management unit 250 creates a list of recommendations for the user based on the user profile data and the content metadata. To this end, the content rating management unit 250 provides one or more agents that perform content rating with the user profile data and the metadata and consolidates content ratings received from the one or more agents. To consolidate the content rating, the content rating management unit 250 may calculate the arithmetic or geometric mean of a value calculated by the user profile data and a value calculated by the content metadata. In the former case, the values from the user profile data and the content metadata are almost equally processed (involving an "OR" concept), while in the latter case, the content is given a high rate when there is something in common between the user profile data and the content metadata (involving an "AND" concept).

Alternatively, the content rating management unit 250 may measure a correlation between the user profile data and the content metadata. In this case, a high rate may be given to the content having a higher degree of correlation. Meanwhile, a list of recommendations may be determined for a list of contents obtained from the content metadata only by the user profile data. However, the above methods should be considered in descriptive sense only and not for purposes of limitation.

In the illustrative embodiment, the agents for content rating are keyword agent 210 and the classifier agent 220. The keyword agent 210 analyzes content description that is loosely formatted or comprised of letters, such as ATSC PSIP or TV-Anytime metadata. The keyword agent 210 performs content rating by calculating a correlation coefficient between the user profile data and the content descriptive metadata for each user and content. The classifier agent 220 performs content rating based on the respective categories, including genres, languages, and channels. To this end, the classifier agent 220 should be designed so as to process hierarchical classifications.

The content recommendation system of the present invention is preferably implemented to be operable when an event occurs to reduce a computational burden. More specifically, each user operates a suitable profiler through the user interface 10. Each profiler evaluates user preference items and allows a user profile management unit 150 to operate when a significant change occurs. The DTV module 300 or the user profile management unit 150 allows the content rating management unit 250 to operate when the content description data is updated or user preference items change. The content rating management unit 250 calls one or more suitable agents in order to obtain a content rating value and uses the content rating value received from the agents to create a list of recommendations for each user.

Figure 2:
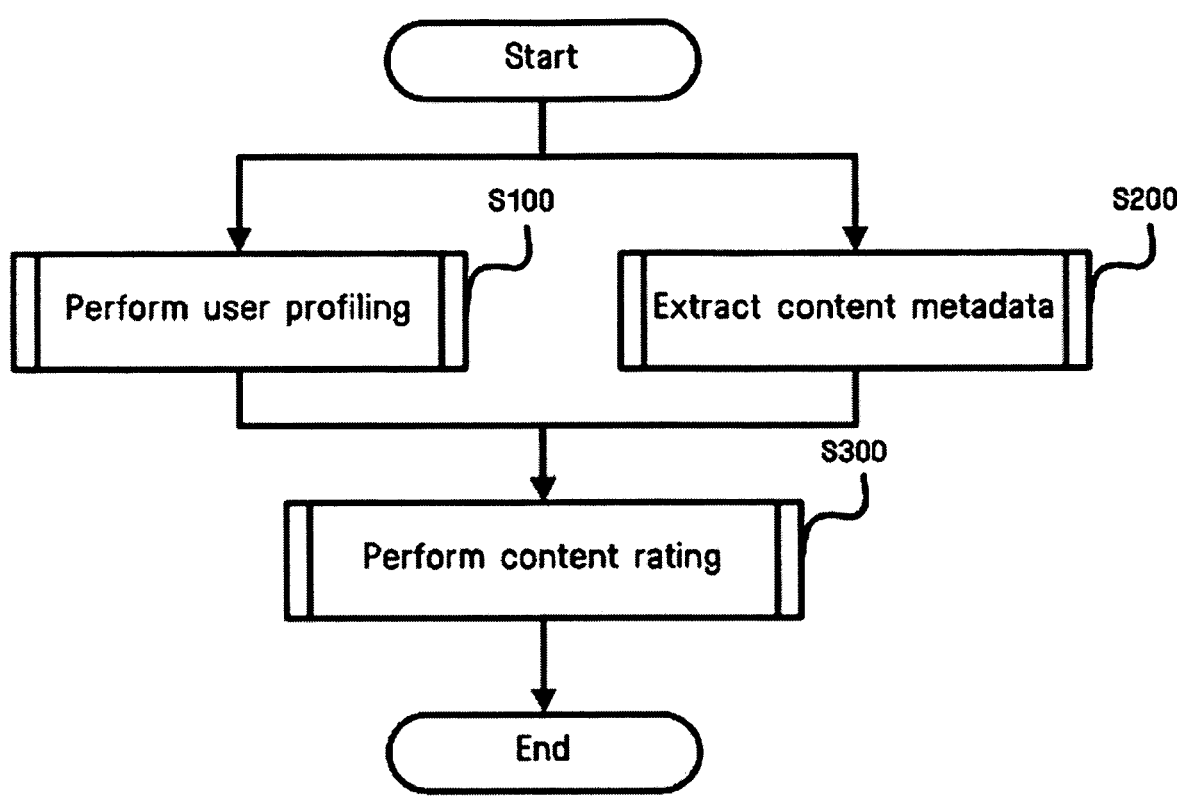
FIG. 2 is a flowchart illustrating a method for recommending content according to an embodiment of the present invention.

FIG. 2 is a flowchart illustrating a process of recommending content according to an embodiment of the present invention. Referring to FIG. 2, user profiling and content metadata extraction processes are performed concurrently to provide information for content recommendation in steps S100 and S200. In step S300, content rating is performed by a keyword agent or classifier agent based on a user profile constructed through the user profiling in the step S100 and content metadata obtained through the content metadata extraction process in the step S200. High-rating contents are recommended to the user. The user profiling, content metadata extraction, and content rating processes in the steps S100, S200, and S300 will now be described in detail with references to FIGS. 3, 4, and 5, respectively.

Figure 3:
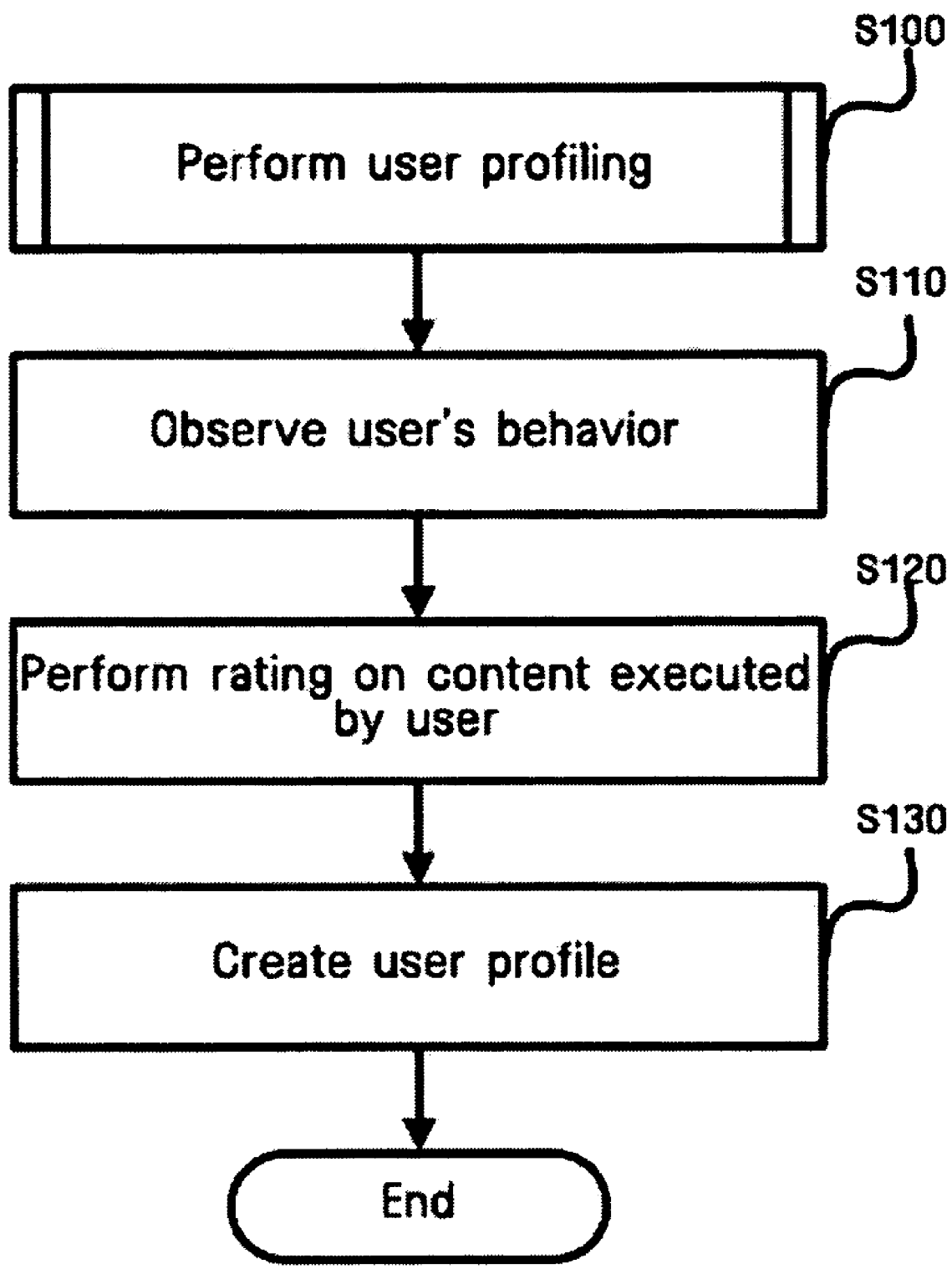
FIG. 3 is a flowchart illustrating the user profiling process illustrated in FIG. 2.

FIG. 3 is a flowchart illustrating the user profiling process shown in FIG. 2, in which an implicit user profiling process is described by way of example. A process of shaping a user profile includes performing rating (step S120) on content executed by the user based on data obtained through observation of a user's behavior (step S110) and creating a user profile (step S130).

First, a user's behavior is observed in step S110. Tracking the user's behavior provides the basis for extracting implicit preference items. Table 1 shows an example of a two-dimensional model of user's behavior associated with DTV content.

TABLE 1

Observable user's behaviors associated with DTV content

|  | Video Frame | Program Segment | Entire Program | Program Group |
|---|---|---|---|---|
| Consume | Pause | Request info<br>Play<br>Pause<br>Rewind<br>Skip backward<br>Fast forward<br>Skip forward<br>Stop | Request info<br>Schedule to tune<br>Tune<br>Play<br>Pause<br>Rewind<br>Skip backward<br>Fast forward<br>Skip forward<br>Stop | Request info |
| Record | Capture still image<br>Copy still image |  | Schedule to record<br>Record<br>Copy<br>Delete | Schedule to record<br>Record<br>Delete |
| Approve | Bookmark<br>Annotate | Add to favorites<br>Annotate | Add to favorites<br>Annotate | Add to favorites<br>Annotate |

In step S120, rating is performed on the observed user's behavior (content execution). Each observable behavior is preferably multiplied by an appropriate weighting factor. For example, the weighting factor for Play operation is proportional to play time. While operations such as Rewind and Repeated play increase a content rating, Delete or Skip operation decreases the same. An implicit content rating R is defined by:

$$R = \frac{\sum_{i=1}^{n} W_i}{T} \quad (1)$$

wherein W is a weight for each behavior, n is the number of behaviors observed in specific content, and T is a length of time during which a content item is run. The sum of the weights W is being divided by the time T because it is reasonable to compare the user's behavior observed per unit of time for each content.

Then, a user profile is created in step S130. While an implicit profile associated with specific user and content can be constructed through the above process, an explicit profile can be created by the user manually entering a preference value for the relevant content or a value of a specific class category such as genre. A stereotype profile can be created by user selecting one of preset profiles, which saves a user the trouble of manually entering the explicit profile information.

Figure 4:
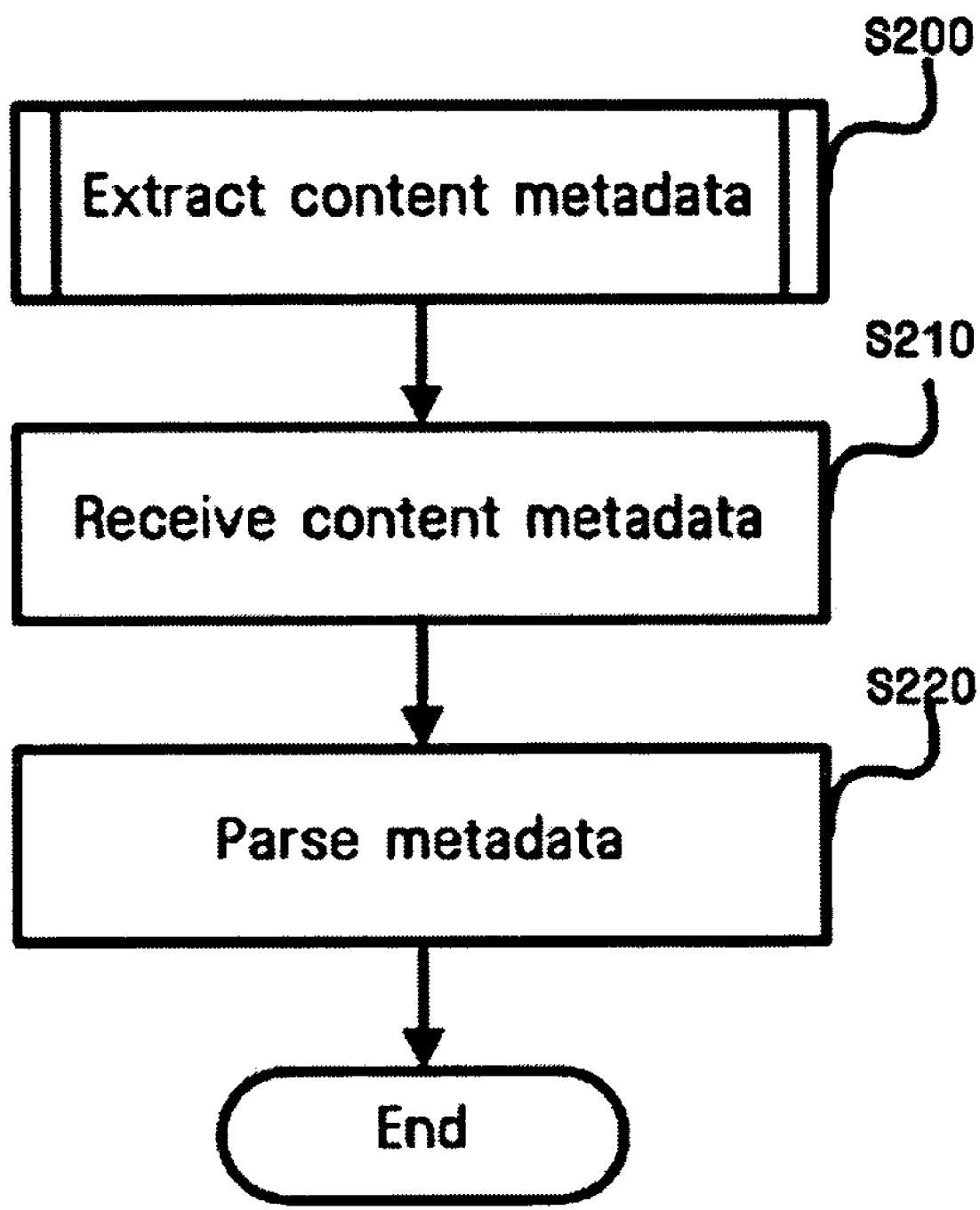
FIG. 4 is a flowchart illustrating the process of extracting content metadata illustrated in FIG. 2.

FIG. 4 is a flowchart illustrating the content metadata extraction process in FIG. 2. In step S210, content metadata is received for extraction. The content metadata can be received through various media. For example, TV-Anytime Content Description Metadata may be made available via an IP network such as the Internet, or PSIP Event Information Table may be received through a DTV tuner. The received data undergo parsing in step S220 and are processed into a suitable form.

Figure 5:
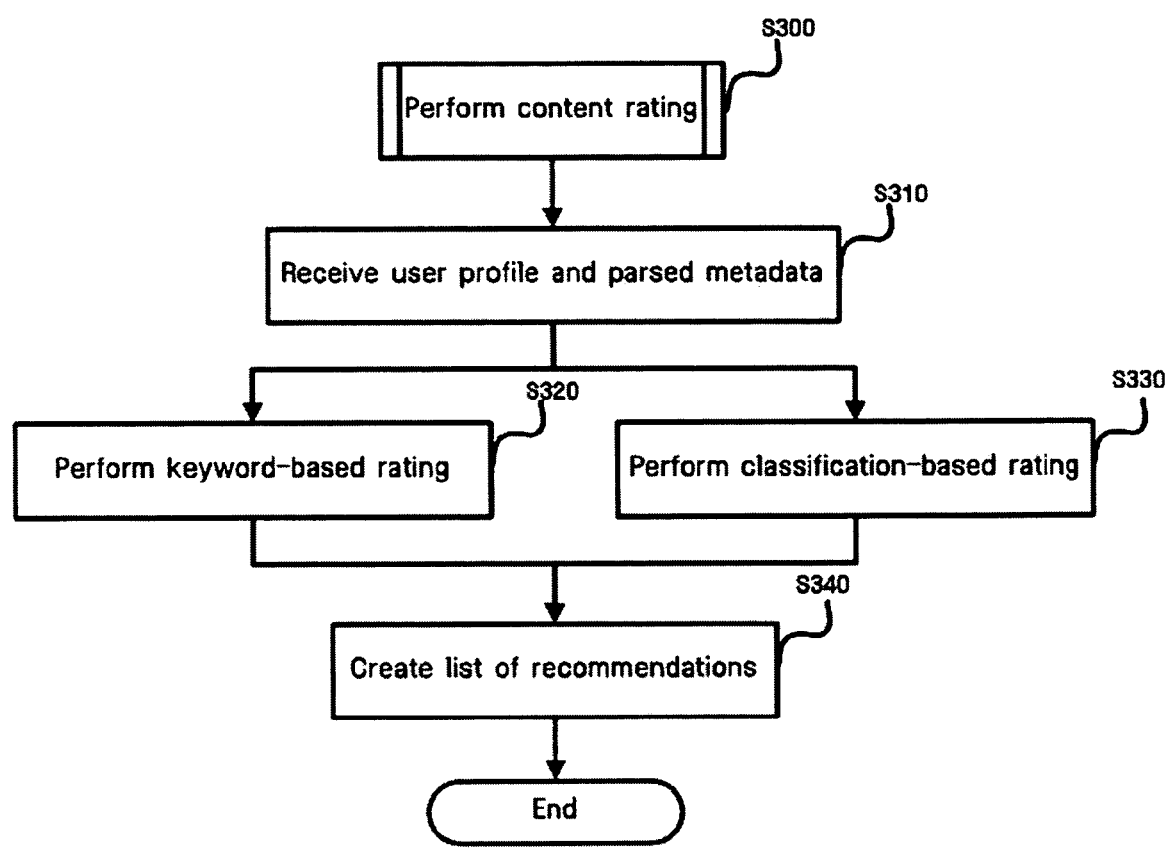
FIG. 5 is a flowchart illustrating the content rating process shown in FIG. 2.

FIG. 5 is a flowchart illustrating the content rating process in FIG. 2. First, the user profile and parsed metadata are received in step S310 and then undergo an appropriate rating process such as keyword-based rating (step S320) and classification-based rating (step S330). The results of the keyword-based rating and the classification-based rating performed in the steps S320 and S330, respectively, are consolidated to create a consolidated content rating, based on which a list of recommendations is created for the user in step S340.

The keyword-based rating is preferably performed based on a class category such as genre or actor/actress. For example, when there are frequent keyword searches for a drama genre, the rating of the drama genre is increased. Similarly, when there are many searches for a specific actor or actress, the rating of movie or drama in which the actor or actress appears is increased accordingly.

Figure 6:
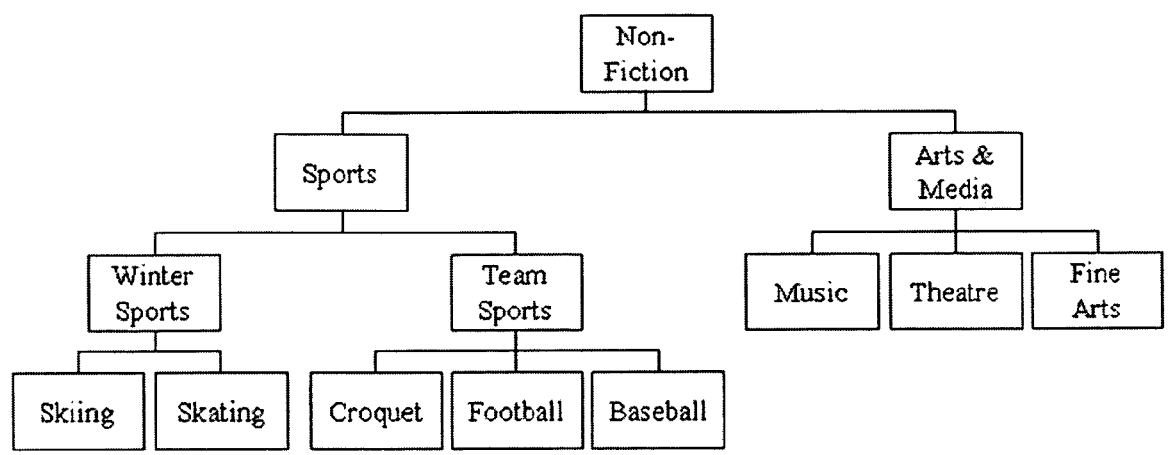
FIG. 6 shows hierarchical classifications of a TV-Anytime genre as an example of content classification.

For the classification-based rating, the user profile contains values of preference items for several class categories. The classification may be made according to genre, channel, language or others. The classification-based rating is used for category-based content recommendation. FIG. 6 illustrates hierarchical classifications of a TV-Anytime genre as an example of content classification. In FIG. 6, a non-fiction genre is classified into Sports and Arts & Media sub-genres. The Sports sub-genre is divided into Winter Sports and Team Sports that is further classified as Croquet, Football, and Baseball.

To create a list of recommendations, associativity is measured between each category entity using a depth or path length. A depth-based associativity measurement method is used to compare two entities based on a depth from a common parent entity in a hierarchical structure.

In FIG. 6, a parent entity of Football and Baseball is Team Sports and their depths from the parent entity are 1 while a parent entity of the Baseball and Skating is Sports and their depths from the parent entity are 2. It is then considered that Football is more closely associated with Baseball than Skating. In other words, Football is more likely to be recommended to a user showing a high preference toward Baseball than Skating. According to a conventional Most Specific Common Abstraction (MSCA) method, Baseball is most closely associated with Croquet and Football. However, it is not deemed reasonable to determine that a user who likes baseball also has a preference toward Croquet.

The associativity method using a path length includes counting the number of links (distances) between entities in a semantic network structure. That is, while when two entities are semantically similar, the number of links between them decreases, the number of links increases when they are semantically different. However, depth and path-based associativity measurement values changes sensitively according to the degree of classification. For example, these approaches may have a problem in that entities located in a more finely classified portion such as Sports are considered less closely associated with each other than those located in a less finely classified portion such as Arts & Media. That is, the depths of Baseball and Skating are 2 while those of Fine Arts and Music are 1. To overcome this problem, a different depth or path length is given according to the degree of classification. For the depth-based associativity measurement, depth and the degree of classification in a hierarchical structure should be considered together. The present invention introduces an associativity measurement model in which the degree of differentiation is considered for associativity measurement. The associativity measurement can be performed according to the following fundamental principles:

1. The more specifically a category is classified, the greater the associativity between entities.
2. The larger the difference in levels between two entities, the less the associativity therebetween.
3. The associative value of a content without rating and the associative value between siblings are 0.

In an exemplary method for calculating an associative value based on the above fundamental principles, the associative value is defined by:

$$\text{Associative value} = \frac{n}{\frac{m}{N} + N} \quad (2)$$

wherein N denotes the total number of levels in a given hierarchical structure, n denotes the level of a parent category in the overall hierarchical structure, and m denotes the depth from a parent category to a child category.

When calculating the degree of associativity using equation (2), the degree of associativity between more finely classified categories is high while that between less finely classified categories is low. For example, since Football and Croquet are sibling categories, an associative value of the siblings is 0. If the user defines a preference value for Team Sports, the associative value of Football is about 0.7 because Team Sports is a category having level 3 (n=3), the depth to Football is 1 (m=1), and the overall structure has level 4 (N=4). By substituting these values into equation (2), the associativity value of about 0.7 can be obtained. If the preference value R for Team Sports is 5 in the user profile, the preference value of Football is 3.5. Similarly, the associative value of Sports and Team Sports is 0.47 while that between Arts & Media and Music is 0.6. Although the depth m is 1 in all cases, the values of associativity are different. The associative value of upper or lower levels in a more finely classified category is higher than that in a less finely classified category. Meanwhile, the associative value of Sports and Baseball is 0.42, which is lower than that of the Sports and Team Sports. This implies that the associative value decreases with increasing depth.

Likewise, the associativity measurement based on a path length may be performed in the same manner as the depth-based associativity measurement. In other words, the higher the degree of classification, that is, the more specifically a category is classified, the greater the associative value of entities spaced a link apart from each other and vice versa.

An associative value is used to calculate a content rating for each entity in a hierarchical classification structure. The contents with ratings that exceed a reference value are gathered to create a list of recommendations.

According to the present invention, a sophisticated model for rating user preference items is provided, thus enabling a user to be given recommendations of contents similar to what he/she likes. Also, the present invention provides more sophisticated content rating for recommendation than conventional methods or systems. In addition, according to the present invention, recommendations from a content provider are rated separately from recommendations based on a user's behavior, thus diversifying degrees of recommendation to the user.

Although the present invention has been particularly shown and described with reference to preferred embodiments thereof, it will be understood by those of ordinary skill in the art that various changes in form and details may be made therein without departing from the spirit and scope of the present invention as defined by the following claims. While the content recommendation system of the present invention has been a DTV on which the user can view the content, the present invention is not limited thereto. For example, the content recommendation system may be provided separately from the DTV. Therefore, it is to be understood that the above described embodiment is for purposes of illustration only and not to be construed as a limitation of the invention. The scope of the invention is given by the appended claims, rather than the preceding description, and all variations and equivalents which fall within the range of the claims are intended to be embraced therein.

What is claimed is:

1. A method for recommending content, comprising:
   creating a user profile according to a predetermined model based on a user reaction to the content, wherein content fields are defined for specific content;
   obtaining content features from one or more data sources; and
   creating a list of recommended contents according to a predetermined process based on the user profile and the content features,
   wherein the creating the user profile comprises defining user behaviors for each of the content fields, applying a different weight to each of the user behaviors, and calculating a content rating for the relevant content according to a predetermined method, and
   wherein the content rating R is:

$$R = \frac{\sum_{i=1}^{n} W_i}{T}$$

wherein W is a weight for each behavior, n is the number of behaviors observed in the specific content, and T is a length of time during which a content item is run.

2. The method of claim 1, wherein in the obtaining content features, the one or more data sources comprise at least one of Advanced Television Systems Committee (ATSC) Program and System Information Protocol (PSIP) metadata and TV-Anytime metadata.

3. The method of claim 1, wherein the creating the list of recommended contents comprises calculating a content rating for each entity in a predetermined hierarchical classification structure using a content rating obtained from the user profile and the content features according to a predetermined calculation method and creating the list of recommended contents that contains contents with ratings exceeding a predetermined value.

4. A method for recommending content, comprising:
   creating a user profile according to a predetermined model based on a user reaction to the content,
   obtaining content features from one or more data sources;
   creating a list of recommended contents according to a predetermined process based on the user profile and the content features, wherein
   the creating the list of recommended contents comprises calculating a content rating for each entity in a predetermined hierarchical classification structure using a content rating obtained from the user profile and the content features according to a predetermined calculation methods and creating the list of recommended contents that contains contents with ratings exceeding a predetermined value, wherein
   the predetermined calculation method is used to obtain an associative value of each $$\text{entity} = \frac{n}{\frac{m}{N} + N}$$

based on the content rating obtained from the user profile and the content features wherein N denotes the total number of levels in a given hierarchical structure, n denotes the level of a parent category in the overall hierarchical structure, and m denotes the depth from a parent category to a child category, and a content rating is obtained for each entity using the associative value obtained.

5. A computer system having a processor and memory under control of the processor, the memory storing instruction modules adapted to enable a processor of the computer to perform operations, the modules comprising:
   a user profiling module that creates a user profile according to a predetermined model based on a user reaction to the content, wherein content fields are defined;
   a digital television module that obtains content metadata from one or more data sources; and
   a content rating module that creates a list of recommended contents based on the user profile and the content metadata received from the user profiling module and the digital television modules,
   wherein the user profiling module comprises:
   at least one profiler that observes user behaviors for each of the content fields; and
   a user profile management unit that applies a different weight to each of the user behaviors observed by the at least one profiler and calculates a content rating for the relevant content according to a predetermined method, and wherein the user profile management unit calculates the content rating R by:

$$R = \frac{\sum_{i=1}^{n} W_i}{T}$$

wherein W is a weight for each behavior, n is the number of behaviors observed in the specific content, and T is a length of time during which a content item is run.

6. The system of claim 5, wherein the digital television module comprises at least one data source containing at least one of a Program and System Information Protocol (PSIP) handler for handling Advanced Television Systems Committee (ATSC) PSIP metadata and a TV-Anytime metadata handler for handling TV-Anytime metadata.

7. The system of claim 5, wherein the content rating module comprises at least one of a keyword agent and a classifier agent, the keyword agent performing content rating by calculating a correlation coefficient between the user profile and the content metadata for each user and content, and the classifier agent performing content rating based on respective categories, comprising genres, languages, and channels.

8. A computer system having a processor and memory under control of the processor, the memory storing instruction modules adapted to enable a processor of the computer to perform operations, the modules comprising:

a user profiling module that creates a user profile according to a predetermined model based on a user reaction to the content;

a digital television module that obtains content metadata from one or more data sources;

a content rating module that creates a list of recommended contents based on the user profile and the content metadata received from the user profiling module and the digital television module, for outputting to the user, wherein the content rating module comprises at least one of a keyword agent and a classifier agent, the keyword agent performing content rating by calculating a correlation coefficient between the user profile and the content metadata for each user and content, and the classifier agent performing content rating based on respective categories, comprising genres, languages, and channels, wherein the classifier agent calculates an associative value of each entity based on the content rating obtained from the user profile and the content metadata, whereby:

$$\text{associative value} = \frac{n}{\frac{m}{N} + N}$$

wherein N denotes the total number of levels in a given hierarchical structure, n denotes the level of a parent category in the overall hierarchical structure, and m denotes the depth from a parent category to a child category, and a content rating is obtained for each entity using the associative value obtained.

* * * * *